(12) United States Patent
Levi et al.

(10) Patent No.: US 11,086,958 B2
(45) Date of Patent: Aug. 10, 2021

(54) NAVIGATION MENU BASED ON CROWD DATA

(71) Applicant: ENTIT SOFTWARE LLC, Sanford, NC (US)

(72) Inventors: Elad Levi, Yehud (IL); Avigad Mizrahi, Yehud (IL); Ran Bar Zik, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 278 days.

(21) Appl. No.: 15/546,066

(22) PCT Filed: Feb. 23, 2015

(86) PCT No.: PCT/US2015/017016
§ 371 (c)(1),
(2) Date: Jul. 25, 2017

(87) PCT Pub. No.: WO2016/137426
PCT Pub. Date: Sep. 1, 2016

(65) Prior Publication Data
US 2018/0004856 A1    Jan. 4, 2018

(51) Int. Cl.
*G06F 16/957* (2019.01)
*G06F 16/958* (2019.01)
*G06F 16/9535* (2019.01)
*G06F 3/0482* (2013.01)
*G06Q 30/06* (2012.01)

(52) U.S. Cl.
CPC .......... *G06F 16/957* (2019.01); *G06F 3/0482* (2013.01); *G06F 16/958* (2019.01); *G06F 16/9535* (2019.01); *G06Q 30/0641* (2013.01)

(58) Field of Classification Search
CPC ...... G06F 17/30; G06F 16/957; G06F 16/958; G06F 16/9535; G06F 3/0482; G06Q 30/0641
USPC ....................................................... 705/27.1
See application file for complete search history.

(56) References Cited

U.S. PATENT DOCUMENTS

| | | | |
|---|---|---|---|
| 8,412,567 B2 | 4/2013 | Evevsky | |
| 8,583,766 B2 | 11/2013 | Dixon et al. | |
| 8,868,737 B2 | 10/2014 | Gagliardi et al. | |
| 9,274,668 B2 * | 3/2016 | Powers | G06Q 10/06316 |
| 2003/0144988 A1 | 7/2003 | Nareddy et al. | |
| 2009/0172021 A1 * | 7/2009 | Kane | G06Q 30/02 |

(Continued)

FOREIGN PATENT DOCUMENTS

| | | |
|---|---|---|
| WO | WO-2007113573 A2 | 10/2007 |
| WO | WO-2008094712 A2 | 8/2008 |

OTHER PUBLICATIONS

International Search Report and Written Opinion; PCT/US2015/017016; dated Dec. 17, 2015; 13 pages.

(Continued)

*Primary Examiner* — Russell S Glass (57) ABSTRACT

In one example in accordance with the present disclosure, a method for a navigation menu of a web technology includes collecting navigation data related to how multiple past users navigate the web technology. The method includes creating, based on the navigation data, a ranked list of navigation chains. The method includes, for a current user, causing display, in the navigation menu, of a high-ranked navigation chain selected from the ranked list.

20 Claims, 5 Drawing Sheets

(56) References Cited

U.S. PATENT DOCUMENTS

| | | |
|---|---|---|
| 2010/0146110 A1 | 6/2010 | Christensen et al. |
| 2010/0281389 A1 | 11/2010 | Hutchinson |
| 2012/0151329 A1 | 6/2012 | Cordasco |
| 2014/0053070 A1* | 2/2014 | Powers ................ G06Q 10/067 715/708 |
| 2014/0115039 A1* | 4/2014 | Dixon .................... G06Q 30/02 709/203 |

OTHER PUBLICATIONS

Rosman, B. et al., On User Behaviour Adaptation under Interface Change, IUI '14, Haifa, Israel, Feb. 24-27, 2014, 6 pages.

Abasov, Misha; "Top 6 Reasons Your Shopping Cart Abandonment Rate is High on Mobile (and How to Fix It)"; Mobify, https:/Iwww.mobify.com; Feb. 12, 2014; 8 pp.

Google Analytics; "Analytics Tools & Solutions for Your Business"; https://marketingplatform.google.com/about/analytics; downloaded on Sep. 9, 2019; 10 pp.

Wikipedia; "A/B testing"; downloaded on Sep. 9, 2019; 5 pp.

\* cited by examiner

NAVIGATION MENU BASED ON CROWD DATA

BACKGROUND

Modern websites and applications (e.g., mobile applications) include many pages that users, can navigate to and many actions that users can perform, e.g., via various buttons, links, menus and the like.

BRIEF DESCRIPTION OF THE DRAWINGS

The following detailed description references the drawings, wherein.

DETAILED DESCRIPTION

Modern websites and applications (e.g., mobile applications) include many pages that users can navigate to and many actions that users can perform, e.g., via various buttons, links, menus and the like. However, as websites and applications become more complex, the screen real estate (i.e., the amount of space available on a display for a website or application to provide output) available to any one page of the website or application remains constant. In some situations, this presents a challenge to developers to decide how much of the screen real estate they will dedicate to navigation actions. A complex website, for example, may have hundreds of pages (or more) that users can navigate to, and it may not be feasible or desirable to provide users a link to navigate directly to every page from every other page of the website. As such, users may need to navigate through multiple (sometimes many) pages to achieve their goal (e.g., to find and purchase a product, to submit a form with information, to find some educational information, etc.). In some situations, users will abandon the process of achieving their goal early, for a variety of reasons (e.g., the navigation path is too complicated, there are too many choices, etc.). This abandonment rate may be an important metric for owners of a website, and may have a direct relationship to how successful the website is (e.g., how much money they make, how many hits they get, how much time users spend on the site, etc.).

In some situations, developers of a website or application can use tools to determine statistics about how users interact with their website, for example, how many users visit or use the website or application, what they click on, how long they remain on a page or on the website, etc. Developers may then be able to use these statistics to make decisions about how to modify their website to improve user interaction. However, these modifications must be done manually by the developer after manually analyzing the statistics. In some situations, developers may use what is called "A/B testing" to determine how to improve their website or application. A/B testing is similar to the manual analysis and manual modification process just described, except developers may offer users multiple versions of a page (e.g., versions with different locations for some page elements, or different sizes of text, images, etc.) of their website or application and collect statistics about each version to see which version results in better user interaction. Again, this is manual process of creating multiple page versions, reviewing which version results in better user interaction and implementing the more successful version.

The present disclosure describes a navigation menu based on crowd data. Crowd data may refer to data collected as multiple users interact with a web technology, e.g., making navigation choices regarding a sequence of pages to visit. Such data from a particular user may be referred to as navigation data, and navigation data from multiple users may be referred to as crowd data. The present disclosure describes automatically analyzing navigation data from multiple past users with respect to a web technology and automatically generating a navigation menu that provides a current user with popular or likely navigation options or actions. The navigation menu may be predictive of a current user's actions because it is based on actions of past users (potentially many past users) that entered the web technology from the same entry point (e.g., start page). For example, the navigation menu may display the most popular navigation chain (i.e., navigating from page to page) based on past users that enter from the same entry point. The present disclosure also describes automatically adapting or updating the navigation menu as more current users experience and interact with the navigation menu. Automatic A/B testing may be used to adapt the navigation menu based on click rates. For example, the click rate of the most popular navigation chain may automatically be compared to the click rates of other popular navigation chains.

The present disclosure may offer benefits such as aiding users in navigating a complex web technology while keeping the layout of the web technology relatively clean and uncluttered. This may result in a better overall user experience and less user frustration. The present disclosure may reduce abandonment rates for web technologies by aiding users in reaching their goal before the user becomes frustrated and exits the web technology. Reduced abandonment rates may translate into benefits for a developer such as a more successful web technology, more revenue, more web technology popularity, etc. Moreover, the present disclosure allows for this automatic generation and adaptation of a navigation menu with minimal interaction from a developer (e.g., once the technology of the present disclosure is implemented and configured). Thus, a developer can reap the benefits described herein without constantly and manually reviewing reports of user interaction and without manually implementing and testing modified web technology versions.

Figure 1:
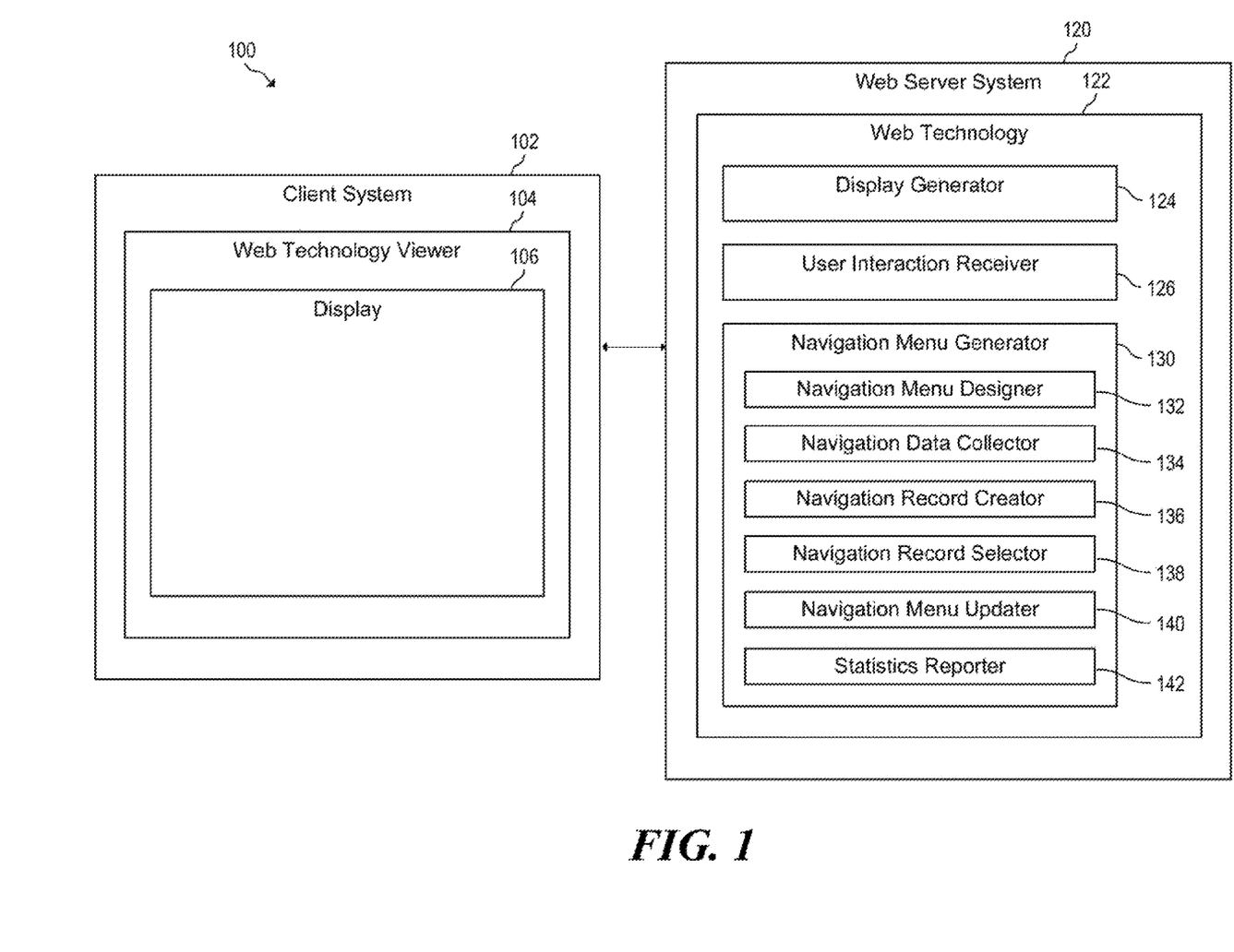
FIG. 1 is a block diagram of an example computing environment in which a navigation menu based on crowd data from multiple users may be useful.

FIG. 1 is a block diagram of an example computing environment 100 in which a navigation menu based on crowd data may be useful. Computing environment 100 may include a client system 102 and a web server system 120. Client system 102 may communicate (e.g., over a network) with web server system 120, for example, to access a web technology (e.g., website, application such as a mobile application, etc.). Web server system 120 may host the web technology (e.g., 122). The above mentioned network may be any wired or wireless network, and may include any number of hubs, routers, switches, cell towers or the like Such a network may be, for example, part of a cellular network, part of the internet and/or part of an intranet and/or other type of network.

Client system 102 may include at least one computing device that is capable of communicating with at least one remote system (e.g., 120) over a network. Client system 102 may include a web technology viewer 104, which may include a display 106. A user of client system 102 may interact with web technology viewer 104 to access the web technology (e.g., 122) of system 120, and the user may view information from the web technology via display 106. In some examples, web technology viewer 104 may be a web browser, and the web technology (hosted on system 120) may be a webpage. In other examples, web technology viewer 104 may be a mobile application, and the web technology may be mobile application server-side code. This disclosure contemplates various other examples of web technology viewers and web technologies.

Web server system 120 may include at least one computing device that is capable of communicating with at least one client system (e.g., 102) over a network. The term "system" may be used to refer to a single computing device or multiple computing devices that communicate with each other (e.g., via a network) and operate together to provide a unified service. Web server system 120 may store (or "host") web technology 122. More specifically, in some examples, web server system 120 may store or host code that implements web technology 122. Web server system 120 may receive requests from client systems (e.g., 102) to interact with web technology 122, and in response, may return data to the client systems. Web technology 122 may include instructions (e.g., stored on a machine-readable storage medium of system 120) that, when executed (e.g., by a processor of system 120), implement the functionality of the web technology. Alternatively or in addition, web technology 122 may include electronic circuitry (i.e., hardware) that implements the functionality of the web technology. Web technology 122 may include a display generator that causes information to display on various displays (e.g., 106) of client systems (e.g., 102). Web technology 122 may include a user interaction receiver 126 that recognizes user input/interaction (e.g., clicking buttons, links, etc.) from various users as they interact with web technology viewers (e.g., 104) while viewing web technology 122.

Web technology 122 may include a navigation menu generator 130. Navigation menu generator 130 may analyze navigation data from multiple users (i.e., crowd data) with respect to web technology 122. Navigation menu generator 130 may communicate with user interaction receiver 126 to access information about how users interact with web technology 122, e.g., what pages they visit, what they click on, how long they stay, etc. Navigation menu generator 130 may automatically generate a navigation menu based on the crowd data. Navigation menu generator 130 may communicate with display generator 124 to cause the navigation menu to display, e.g., as part of at least one page of the web technology. Navigation menu generator 130 may include a navigation menu designer 132, a navigation data collector 134, a navigation record creator 136, a navigation record selector 138, a navigation menu updater 140 and a statistics reporter 142. Each of these components (and navigation menu generator 130 overall) may include instructions (e.g., stored on a machine-readable storage medium of system 120) that, when executed (e.g., by a processor of system 120), implement the functionality of the component. Alternatively or in addition, each of these components (and navigation menu generator 130 overall) may include electronic circuitry (i.e., hardware) that implements the functionality of the component.

Navigation menu designer 132 may allow a developer to define the general location, look and feel of a navigation menu and how the navigation menu should be displayed on at least one page of the web technology.

Figure 2:
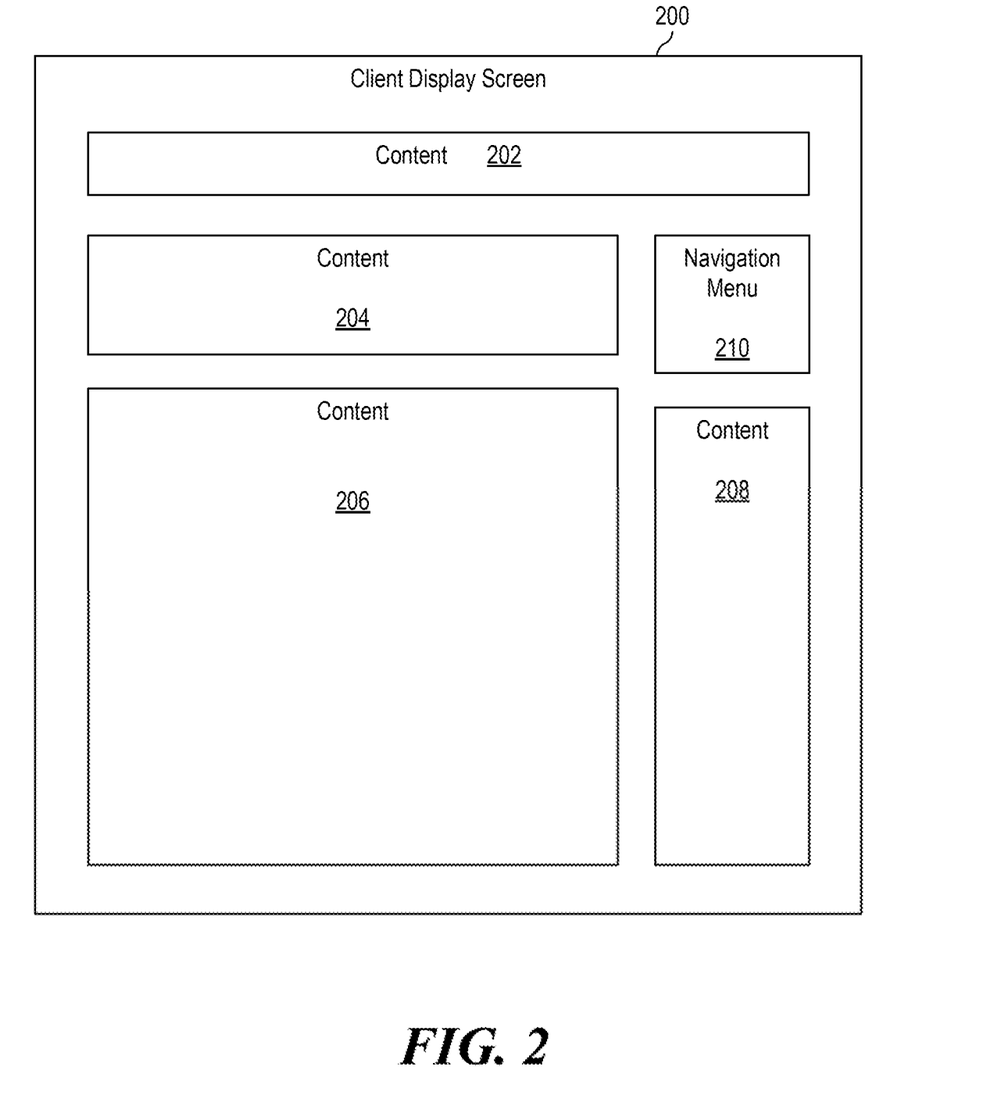
FIG. 2 illustrates an example client display screen that may be shown via a display as a user interacts with a web technology using a web technology viewer.

Referring momentarily to FIG. 2, an example client display screen 200 is illustrated. Client display screen 200 may, for example, be shown via display 106 of FIG. 1 as a user interacts with web technology 122 using web technology viewer 104. When a navigation menu is generated and displayed to a user (more details provided below), the navigation menu may display as shown in the example of FIG. 2. In this example, a page (e.g., consuming all of screen 200) of the web technology may include various pieces of content (e.g., 202, 204, 206, 208). These pieces of content may be, for example, text, images, menu bars, buttons, links, etc. Additionally, a navigation menu 210 may be displayed. The developer may determine the most appropriate place to locate the navigation menu considering the layout of the page or website. The location, size, orientation and the like of navigation menu 210 may be customizable by a developer using navigation menu designer 132 of FIG. 1. In other words, using navigation menu designer 132, a developer may determine a predefined location, size, etc. (e.g., using a hook function or the like) fore where the navigation menu will be displayed even if the exact contents of the navigation menu are not yet determined or may change.

Additionally, a developer may use navigation menu designer 132 to define the graphical design of the navigation menu. In a similar manner to the location, size, orientation, etc. of the navigation menu, a developer may determine the general graphical look and feel of the navigation menu even if the exact contents of the navigation menu are not yet determined or may change. As one example, the graphical design of the navigation menu could be defined using CSS or any other similar web component Navigation menu designer 132 may also allow a developer to import at least one configuration setting (e.g., via a configuration file) that indicates any or all of the definitions explained above (e.g., location, size, orientation, graphical look and feel, etc.). This may allow a developer to quickly establish display settings for the navigation menu where the display settings may have been defined at a previous time. Navigation menu designer 132 may also allow a developer to establish a title or label for the navigation menu 210 that displays all of the time, even as other content in the navigation menu may change. Such a title or label may read, for example, "popular site navigation," or "other people have gone here," or similar type of title or label.

Referring again to FIG. 1, navigation data collector 134 may access navigation data from multiple users (i.e., crowd data) with respect to web technology 122. This navigation data may include information about how users interact with web technology 122, for example, what pages they visit, what they click on, how long they stay on a page or on the website, etc. In one specific example, navigation data collector 134 may keep track of each page that a user visits while navigating web technology 122. In other examples, navigation data collector 134 may keep track of, with respect to at least one page of web technology 122, page elements that a user interacts with and/or other actions that the user takes via a web technology viewer (e.g., 104). Navigation data collector 134 may send information that it tracks to navigation record creator 136 to create records when appropriate, as described in more detail below.

In some examples, navigation data collector 134 may determine whether a user is a "unique user." For example, navigation data collector 134 may determine whether a user is a unique visitor to the web technology over a defined time period (e.g., within the last month, year, all time, etc.). Navigation data collector 134 may also implement other concepts of unique users. In order to track whether a user is unique, navigation data collector 134 may store "identification data" of current users and past users (e.g., storing past user data for at least a defined period of time or while storage space permits). Identification data of a user may be associated with the user or with the user's client system and/or web technology viewer. Identification data may include a user's Internet Protocol address (IP address), tracker identifier supplied by a web cookie and/or other similar tracking methods. Navigation data collector 134 may send user uniqueness information to navigation record creator 136 along with the navigation data it sends, allowing navigation record creator 136 to handle the navigation data differently depending on the uniqueness of the user. In some situations, determining unique users and handling navigation data differently depending on unique users, may result in more accurate and useful stored data, which may result in navigation menu generator 130 creating more useful navigation menus. However, in some examples, navigation data collector 134 may not determine whether users are unique and navigation record creator 136 may not use unique user information. In these examples, the navigation data (i.e., anonymous navigation data) may be collected and used in the aggregate.

Navigation record creator 136 may create navigation records for users as they navigate web technology 122. Navigation record creator 136 may receive information from navigation data collector 134 about how a user is navigating the web technology (e.g., which pages the user is visiting, how long they are staying on a page or on the website, etc.). For each user's "session" (e.g., the time that the user is actively connected to the web technology via a web technology viewer) on the website, navigation record creator 136 may start to record navigation data and may end recording when the user either achieves a "success goal" or abandons the session short of a success goal. Navigation record creator 136 may allow a developer to define at least one success goal. Example success goals include navigating to a product page, navigating to a product checkout page, completing checkout of a product (i.e., completing a money transaction), submitting a form (e.g., signing up for a service, opening or closing a support ticket, etc.) with valid information, navigating to a page with particular information, remaining on a page, subset of pages or on the website overall for a defined period of time, and many other examples. When a success goal is reached, navigation record creator 136 may save the record (i.e., the recorded navigation data). If the user abandons the session before achieving a success goal, navigation record creator 136 may delete the record or mark the record as invalid or ready for removal. In other words, successful navigation records may be saved and unsuccessful navigation records may be removed or omitted.

Navigation record creator 136 may mark each successful record with an entry point. An entry point is a page of a web technology where a user first (e.g., for a particular session) enters the web technology. As a specific example, because search engines index multiple pages of websites, users may enter a website from almost any page, and the particular page where the user enters is the entry point. Navigation record creator 136 may categorize or sort all the successful, records according to their entry points. This may allow a useful navigation menu to be provided to a user later on because a later user can be supplied with information based on navigation data from users that entered the web technology from the same entry point. Navigation record creator 136 may consolidate and/or count identical successful records (i.e., records with the same entry point and same navigation data). The count for a particular navigation record may indicate the number of users that exhibited that same navigation behavior. If unique users are tracked by navigation data collector 134 (see above), the count may indicate the number of unique users that exhibited that same navigation behavior. In either case, the count indicates the popularity of a particular navigation record, navigation chain, navigation pattern, etc. given a particular entry point.

Navigation record creator 136 may store successful records in a table or similar data format stored in a database, data store or other repository of system 120. Such a repository may store digital information may include or be in communication with at least one physical storage mechanism (e.g., hard drive, solid state drive, volatile or non-volatile memory, tape drive or the like).

Table 1 below shows one example table that stores successful records of an example book-selling website. The storage of these records occurs in accordance with various descriptions provided above (e.g., via a navigation record creator such as 136). In the example of table 1, each row stores a unique record, and identical records have been consolidated and counted (see the first column labeled "Record Count").

TABLE 1

| Record Count | Entry point | Step 1 | Step 2 | Step 3 | Step 4 |
|---|---|---|---|---|---|
| 20 | Horror books | King's books | Dr. Sleep | Checkout [success!] | |
| 15 | Horror books | Most popular books | Dr. Sleep | Checkout [success!] | |
| 6 | Horror books | Writers that start with K | Writers that starts with L | Lovecraft stories | Checkout [success!] |
| 3 | Horror books | Writers that start with K | Most popular books | Dr. Sleep | Checkout [success!] |

Table 1 shows, for each record, the entry point, as described above. For this example, each record has the same entry point which is a page that displays all "horror books." The entry point can be stored in the table with any identifying information that is useful. For example, a full URL can be stored, or just a URL extension, or a page name, or other identifier. In table 1, to the right of the record count and the entry point, each record shows the navigation data for that record. In this example, the navigation data is a chain of pages that were navigated to starting from the entry point. This data may be referred to as a navigation chain. For example, looking at the first row of Table 1, a user entered at the horror books page, and then navigated to a page that shows Stephen King books (named "King's books"), and then navigated to a page for a particular book called "Dr. Sleep." The user then navigated to the checkout page for that book. At the end of each record, it can be seen in Table 1 that the last visited page shows "success." These indications of success are based on success goals (e.g., established by a developer as described above). Here, the success goal is to arrive at the checkout page for a book. In other examples, the success goal may be to actually checkout or purchase the book (i.e., money transaction), or various other success goals as described above.

Table 1 shows a record count (first column) for each unique record. As described above, the record count may indicate the number of users (or unique users if unique users are tracked) that followed the same navigation chain starting at the same, entry point. In Table 1, the records for each entry point are sorted by the record count, with the most popular records appearing first. It should be understood that in some examples, more records may be stored than are shown in Table 1, representing more than one entry point, and a table similar to table 1 may store, for each entry point, a sorted (by popularity) list of records (e.g., each including a navigation chain). In the example of Table 1, it can be seen that, for the "horror books" entry point, the most popular record includes a navigation chain to the King's books page, then to the Dr. Sleep page and then to the checkout page for Dr. Sleep. As described below, this navigation chain may be precisely what is displayed in an navigation menu to a future user that enters this book-selling website at the same entry point ("horror books").

Table 2 below shows another example table that stores successful records of an example news website. The storage of these records occurs in accordance with various descriptions provided above (e.g., via a navigation record creator such as 136).

TABLE 2

| Record Count | Entry point | Step 1 | Step 2 | Step 3 | Step 4 |
|---|---|---|---|---|---|
| 35 | News website > Political news | Story 1 | Survey 1 data entry page | Submit Survey 1 [success!] | |
| 20 | News website > Political news | Story 1 | Comments page for story 1 | Survey 1 data entry page | Submit Survey 1 [success!] |
| 11 | News website > Political news | Story 2 | Survey 2 data entry page | Submit Survey 2 [success!] | |
| 6 | News website > Political news | Story 1 | Story 2 (related story) | Survey 2 data entry page | Submit Survey 2 [success!] |

Table 2 is similar to Table 1 in some respects. However, Table 2 shows a success goal that is not related to a product or money transaction. In the example of Table 2, the success goal is to submit a survey with data entered by a user. Similar to Table 1, in Table 2, each record has an entry point, and a navigation chain that starts at the entry point and ends at a success goal. As one example, looking at the first row of Table 2, a user may enter the news website at the main "Political News" page. Then, the user may proceed to click on a fink for a first news story (named "Story 1" here), and then on a link for a survey related to story 1. Then, after entering the date requested by the survey, the user may press a button to submit the survey, at which point, a success goal is achieved.

It should be understood that Tables 1 and 2 show just some examples of navigation data stored for just some example web technologies. Other examples are contemplated by this disclosure. For other examples, a table may store other types of navigation data, for example, pages where users spent the most time after entering a page from a particular entry point. Many other examples of navigation data are contemplated by this disclosure, and the examples of navigation data including "navigation chains" is just one example.

Navigation record selector 138 may detect when a current user enters the web technology 122 and from which entry point. Navigation record selector 138 may then determine which navigation record should be used to display a navigation menu to the current user. Navigation record selector 138 will have more interesting navigation data/crowd data to select from once navigation data is collected and stored for multiple past users, as described above. In some examples, as the number of stored records based on past users increases, navigation record selector 138 may have access to more accurate and more predictive data. In some examples, navigation record selector 138 may wait until the store of navigation data (i.e., records) is large enough (e.g., a determined amount of data, number or records, number or records per entry point, etc.) before it selects records for current users. In other examples, navigation record selector 138 may select or supply information even if the store of navigation data is not large. Specifically, navigation record selector 138 could select a placeholder record predetermined by a developer, or could supply an advertisement, or even supply blank information, until the store of navigation data becomes large enough.

When the store of navigation data/crowd data is large enough (predetermined as described above), navigation record selector 138 may select, for a current user entering the web technology from a particular entry point, the most popular record (from recorded past data) with the same entry point. Using the example of Table 1, if a current user entered the book-selling website from the "honor books" entry point, navigation record selector 138 may select the navigation record from the first row of Table 1 (i.e., the navigation chain to the King's books page, then to the Dr. Sleep page and then to the checkout page for Dr. Sleep). This record selection may be a "first try" of sorts at providing predictive information (e.g., likely navigation chain, likely or suggested actions, etc.) to current users. Thus, it may be referred to as a first-try navigation menu. Different records may be selected in the future as the navigation menu is updated or adapted, as is described below (e.g., with respect to navigation menu updater 140).

Navigation record selector 138 may display, for the current user, navigation data (e.g., navigation chain) of the selected record. In this respect, as this current user enters the web technology, the user may see a navigation menu that shows a likely or suggested navigation chain based on information from past users that entered the web technology from the same entry point. Navigation record selector 138 may communicate with display generator 124 to display a navigation menu to the current user that includes the navigation data of the selected record. For example, navigation record selector 138 and display generator 124 may cause a navigation menu to display like is shown in FIG. 2 (navigation menu 210). In this respect, the navigation menu may be displayed to the user in its pre-determined location and with its pre-determined look and feel (e.g., determined via navigation menu designer 132), and may now also be populated with content, that content being the navigation data (e.g., navigation chain) selected by navigation record selector 138.

Specifically, in the example of Table 1 above, the navigation menu for a user that enters via the "horror books" entry point may show a chain of links or buttons (e.g., hyperlinks), where each step in the chain, if clicked on, may navigate to the page associated with that step. In other words, in some examples, a complete navigation chain may be displayed with each step in the navigation chain being, an active hyperlink. In other examples, just the end of a chain (e.g., the checkout page for a book) may be shown, or the whole chain may be shown, but only the checkout step may be an active hyperlink. Many other variations for displaying popular navigation data are contemplated by this disclosure. A benefit of displaying such a predictive navigation menu to a current user that enters the web technology is that the user may see the navigation menu and skip all the navigation steps that the user may have done to reach the success goal (e.g., the book checkout page), and may go directly to the end page. This may benefit the user, saving the user time and suggesting popular content, and it also may benefit the owner of the webpage who may see users reach a success goal before abandoning.

Navigation menu updater 140 may update or adapt navigation menus (e.g., 210 of FIG. 2) displayed to users after a number of users experience and interact with the navigation menus. After navigation record selector 138 selects, for each entry point, a record to be displayed to new users in the navigation menu, users may begin to experience the navigation menu as they enter the web technology from the various entry points. Navigation menu updater 140 may measure the efficiency (e.g., click rate) of the first-try navigation menu. As mentioned above, the most popular navigation record for each entry point may be considered a "first try". A second most popular navigation menu may be considered a "second try" and so on. To measure the efficiency of a first-try navigation menu, navigation menu updater 140 may record clicks of the navigation menu by users, and may calculate a click rate by dividing the number of menu clicks by the number of visits (or unique visits if tracked) to the page displaying the navigation menu. Navigation menu updater 140 may record clicks and measure the click rate for a determined period (e.g., until a determined number of visits, for a determined number of days, etc.).

Navigation menu updater 140 may then, once clicks are recorded for a determined period, calculate whether the click rate is above an acceptable level. One example way to calculate this is to compare the click rate to a ratio calculated from the ranked list or table (e.g., Table 1) created by navigation record creator 136. For example, for a particular entry point, the ratio may equal the count for the most popular record divided by the sum of the counts for all the records (for that particular entry point). Then, if the click rate for the first-try menu is less than this ratio, navigation menu updater 140 may swap in a second-try navigation menu (e.g., from the second most popular navigation record) for the first-try menu. In the example of Table 1, the record with a count of 15 may be swapped in. The second-try navigation menu may be displayed to future users via cooperation with display generator 124. The just explained efficiency calculation can be summarized as saying that if the click rate of the most popular navigation record is below the popularity ratio of the most popular navigation record (as calculated from actual navigation data from past users), then a different navigation record will be tried.

Navigation menu updater 140 may then, once a second-try navigation menu is displayed to future users, calculate whether the click rate of this updated menu is better than the first-try menu. In this respect, navigation menu updater 140 may perform automatic A/B testing between the first-try navigation menu and the second-try navigation menu. If the second-try navigation menu has a better click rate than the first-try menu, the second-try menu may remain as the selected navigation menu, for the time being at least. Later actual navigation patterns of users could change the popularity rankings in the table (e.g., Table 1), for example. If the second-try navigation menu has a worse click rate than the first-try menu, a third-try navigation record may be tried and compared to the first-try menu, and so on. The number of records down the ranked list that are tried in this process may depend on a developer selected setting.

Statistics reporter 142 may create and provide information about navigation records that were selected for various entry points of the web technology. Such information could be provided in the form of a report to a developer, for example. The information about the navigation records selected for various entry points may change over time, for example, as more navigation data from past users is collected and as navigation menus are updated based on navigation menu click rates. Thus, statistics reporter 142 may create and provide updated information at various points in time. Developers may use this information to determine whether the automated features of the present disclosure (e.g., automated record selection, automated navigation menu updating, etc.) are causing the developer's web technology to display in a manner that is acceptable to the developer.

Figure 3:
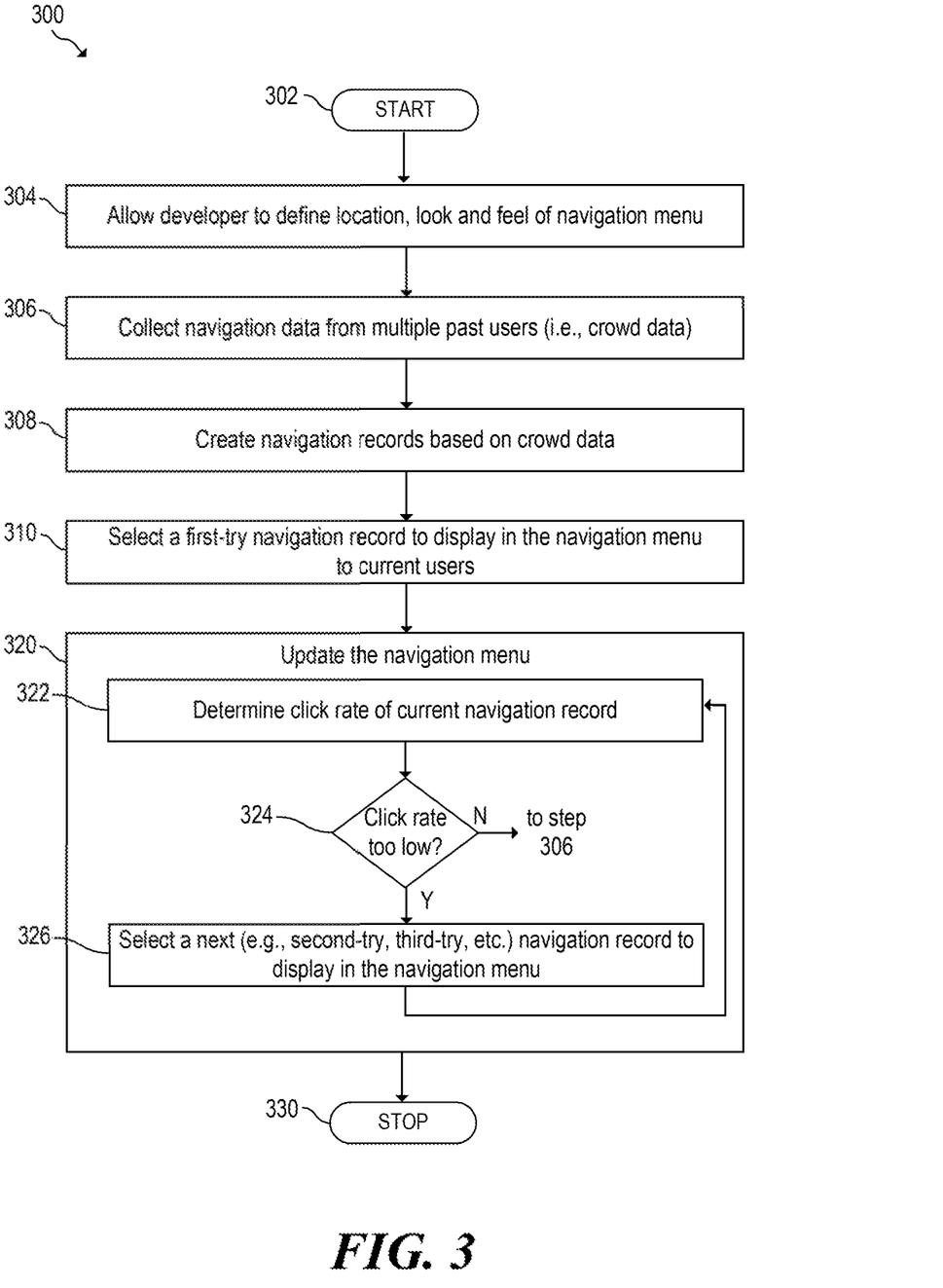
FIG. 3 is a flowchart of an example method for a navigation menu based on crowd data from multiple users.

FIG. 3 is a flowchart of an example method 300 for a navigation menu based on crowd data. Method 300 may be described below as being executed or performed by a system, for example, system 120 of FIG. 1. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where the system may allow a developer (e.g., via navigation menu designer 132 of FIG. 1) to define the location, look and feel of a navigation menu of a web technology, as is described in more detail above. At step 306, the system may collect (e.g., via navigation data collector 134) navigation data from multiple past users of the web technology (i.e., crowd data), as is described in more detail above. At step 308, the system may create (e.g., via navigation record creator 136) navigation records based on the crowd data, as is described in more detail above. At step 310, the system may select (e.g., via navigation record selector) a "first try" navigation record to display in the navigation menu (resulting in a first-try navigation menu) to current users, as is described in more detail above. At step 320, the system may update (e.g., via navigation menu updater) the navigation menu, as is, described in more detail above.

Step 320 includes multiple sub-steps (322, 324, 326), which will be referred to as simply "steps" for ease of description. At step 322, the system may determine the click rate of the current navigation record, as described in more detail above. The current navigation record will be the first-try record at first, and may be a lower popularity navigation records in later iterations. At step 324 the system may determine whether the click rate is too low. As described above, a click rate for a first-try navigation menu may be compared to a ratio calculated from a ranked list of navigation records (e.g., created at step 308). Click rates for lower popularity navigation records/menus may be compared to the click rate of the first-try record/menu. If, at step 324, the click rate is not too low, the system may keep the first-try record/menu as the navigation menu to display to current users. Method 300 may then return to step 306 where new navigation that is collected may change the first-try record/menu. If at step 324, the click rate is too low, method 300 may proceed to step 326. At step 326, the system may select a next or lower popularity (e.g., second-try, third-try, etc.) navigation record to display in the navigation menu, in place of the first-try record. Then, method 300 may proceed back to step 322 to determine a click rate and determine whether the click rate is too low. Method 300 may eventually continue to step 330, where method 300 may stop.

Figure 4:
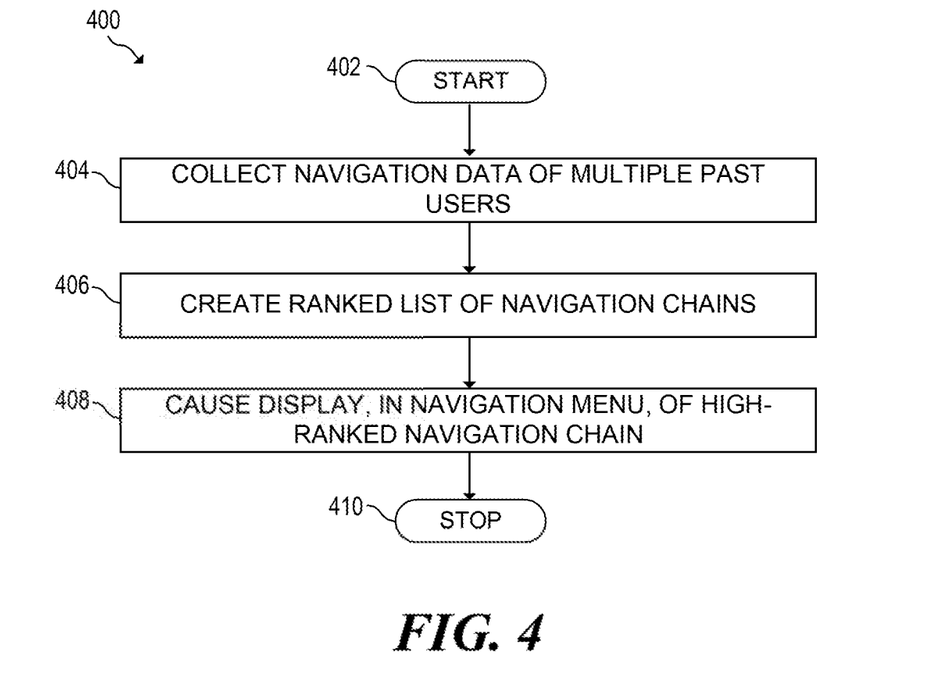
FIG. 4 is a flowchart of an example method for a navigation menu based on crowd data.

FIG. 4 is a flowchart of an example method 400 for a navigation menu based on crowd data. Method 400 may be described below as being executed or performed by a system, for example, system 120 of FIG. 1, system 500 of FIG. 5 or system 600 of FIG. 6. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate embodiments of the present disclosure, one or more steps of method 400 may be executed substantially concurrently or, in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where the system may collect navigation data related to how multiple past users navigate a web technology. At step 406, the system may create, based on the navigation data, a ranked list of navigation chains. At step 408, they system may, for a current user, cause display, in the navigation menu, of a high-ranked navigation chain selected from the ranked list. Method 400 may eventually continue to step 410, where method 400 may stop.

Figure 5:
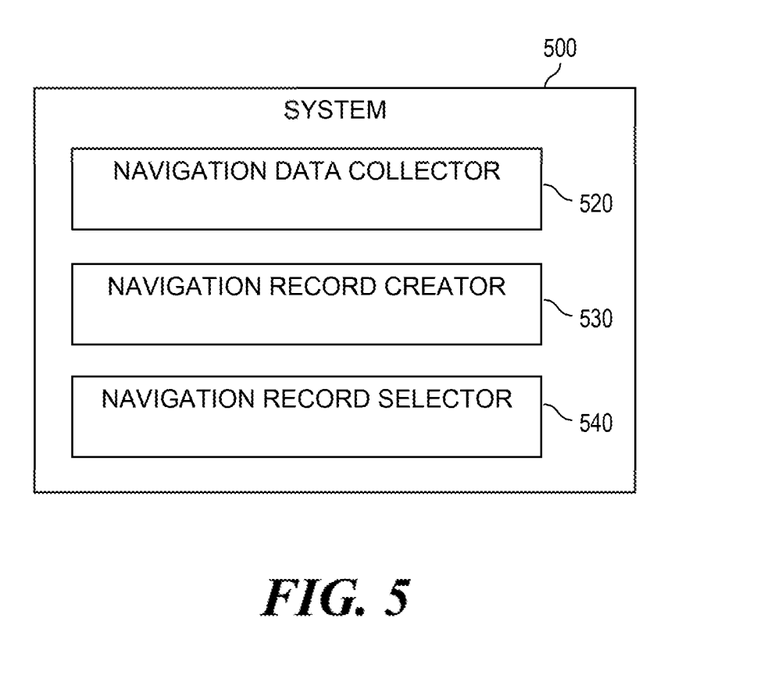
FIG. 5 is a block diagram of an example system for a navigation menu based on crowd data.

FIG. 5 is a block diagram of an example system 500 for a navigation menu based on crowd data. System 500 may be similar to system 120 of FIG. 1, for example. In the embodiment of FIG. 5, system 500 includes a navigation data collector 520, a navigation record creator 530 and a navigation record selector 540. Navigation data collector 520 may be similar to navigation data collector 134 of FIG. 1, for example. Navigation data collector 520 may collect navigation data related to how multiple past users navigate a web technology as they enter from particular entry points. Navigation data collector 520 may be implemented in the form of executable instructions stored on at least one machine-readable storage medium of system 500 and executed by at least one processor of system 500. Alternatively or in addition, navigation data collector 520 may be implemented in the form of one or more hardware devices including electronic circuitry for implementing the functionality of navigation data collector 520.

Navigation record creator 530 may be similar to navigation record creator 136 of FIG. 1, for example. Navigation record creator 530 may store the navigation data in a data store. Navigation record creator 530 may also group the navigation data by unique entry points and rank it by popularity. Navigation record creator 530 may be implemented in the form of executable instructions stored on at least one machine-readable storage medium of system 500 and executed by at least one processor of system 500. Alternatively or in addition, navigation record creator 530 may be implemented in the form of one or more hardware devices including electronic circuitry for implementing the functionality of navigation record creator 530.

Navigation record selector 540 may be similar to navigation record selector 138 of FIG. 1, for example. Navigation record selector 540 may, for a current user, automatically generate a navigation menu that provides popular navigation data. The popular navigation data is selected from the data store based on the current user's entry point, where the popular navigation data is associated with the same entry point. Navigation record selector 540 may be implemented in the form of executable instructions stored on at least one machine-readable storage medium of system 500 and executed by at least one processor of system 500. Alternatively or in addition, navigation record selector 540 may be implemented in the form of one or more hardware devices including electronic circuitry for implementing the functionality of navigation record selector 540.

Figure 6:
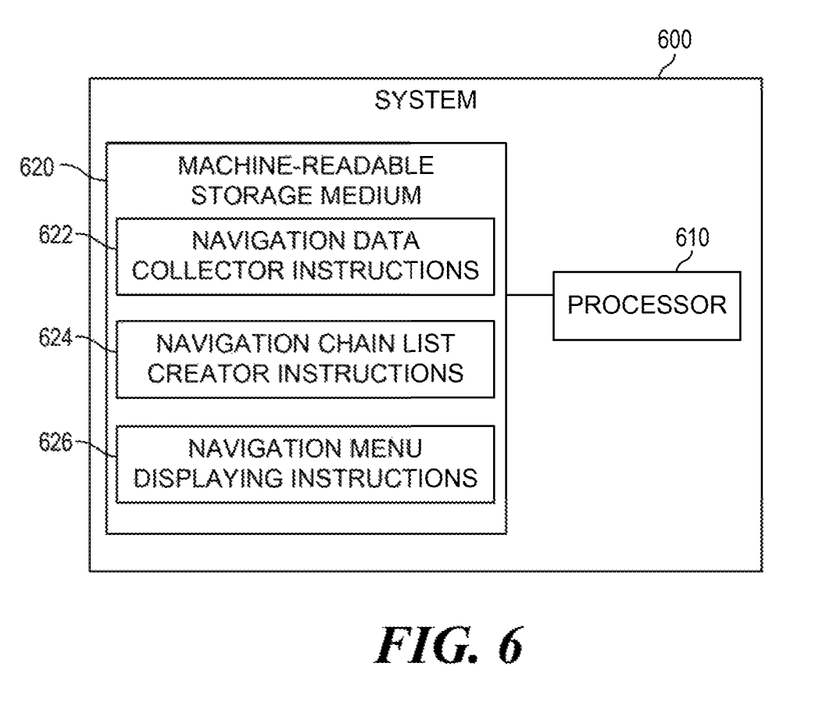
FIG. 6 is a block diagram of an example system for a navigation menu based on crowd data.

FIG. 6 is a block diagram of an example system 600 for a navigation menu based on crowd data. System 600 may be similar to system 120 of FIG. 1, for example. In the embodiment of FIG. 6, system 600 includes a processor 610 and a machine-readable storage medium 620. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in machine-readable storage medium 620. In the particular embodiment shown in FIG. 6, processor 610 may fetch, decode, and execute instructions 622, 624, 626 to adapt a navigation menu. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 620 may be, any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within system 600, as shown in FIG. 6. In this situation, the executable instructions may be "installed" on the system 600. Alternatively, machine-readable storage medium 620 may be a portable, external or remote storage medium, for example, that allows system 600 to download the instructions from the portable/external/remote storage medium. In this situation, the executable instructions may be part of an "installation package". As described herein, machine-readable storage medium 620 may be encoded with executable instructions for a navigation menu based on crowd data.

Referring to FIG. 6, navigation data collector instructions 622, when executed by a processor (e.g., 610), may cause system 600 to collect navigation data related to how multiple past users navigate a web technology as they enter from particular entry points. Navigation chain list creator instructions 624, when executed by a processor (e.g., 610), may cause system 600 to create, based on the navigation data, a ranked list of navigation chains. Each navigation chain starts at an associated entry point and ends at a page where it is determined that a defined success goal has been achieved. The ranking of the list is based on a number of past users that exhibit the same navigation chain. Navigation menu displaying instructions 626, when executed by a processor (e.g., 610), may cause system 600 to, for a current user, display, in the navigation menu, a high-ranked navigation chain selected from the ranked list. The high-ranked navigation chain has an entry point that is the same as an entry point of the current user.

The invention claimed is:

1. A method comprising:
    collecting, by a processor, navigation data related to how multiple past users navigate among a plurality of pages associated with a web site, the navigation data comprising, for each session of each of the multiple past users, an entry point corresponding to a given page of the plurality of pages and at least one of a uniqueness indication of whether or not a respective past user is a unique user and a success goal indication of whether or not a respective session achieved a defined success goal;
    filtering, by the processor, the navigation data based on the at least one of the uniqueness indication and success goal indication to provide filtered navigation data;
    creating, by the processor based on the filtered navigation data, an ordering of navigation chains having an associated ranking, wherein each navigation chain of the ordering of navigation chains represents a sequence of pages of the plurality of pages visited by a past user of the multiple past users and having a common entry point; and
    receiving, by the processor, a selection, via a user interface, of the web site at a selected entry point, selecting a given navigation chain of the ordering of navigation chains based on the ranking, and providing, by the processor, data to display on the given page corresponding to the selected entry point, in a navigation menu, wherein the navigation menu corresponds to the sequence of pages represented by the given navigation chain.

2. The method of claim 1, wherein the at least one of a uniqueness indication of whether or not the respective past user is a unique user and a success goal indication of whether or not the respective session achieved a defined success goal comprises the uniqueness indication of whether or not the respective past user is a unique user, wherein the uniqueness indication comprises identification data of the respective past user, the identification data being associated with the respective past user, a client system of the respective past user, and/or a web technology viewer associated with the respective past user and comprises one or more of the respective past user's Internet Protocol address (IP address) and tracker identifier supplied by a web cookie, wherein selecting the given navigation chain comprises selecting the given navigation chain based on the entry point, and further comprising:
    processing, by the processor, the navigation data comprising the uniqueness indication differently from navigation data not comprising the uniqueness indication.

3. The method of claim 1, wherein the at least one of a uniqueness indication of whether or not the respective past user is a unique user and a success goal indication of whether or not the respective session achieved a defined success goal comprises the success goal indication of whether or not the respective session achieved a defined success goal, and further comprising:
    processing, by the processor, navigation data associated with a success goal indication indicating that the respective session achieved the defined success goal differently than navigation data associated with a success goal indication indicating that the respective session failed to achieve the defined success goal;
    determining, by the processor, a click rate for the given navigation chain; and
    providing, by the processor, data to update the navigation menu to correspond to another sequence of pages associated with a second navigation chain of the ordering of navigation chains in response to the click rate being below a predefined number or a predefined ratio.

4. The method of claim 1, further comprising:
    determining, by the processor, a first click rate for the given navigation chain;
    comparing, by the processor, the first click rate to a ratio calculated from the ordering of navigation chains, wherein the ratio indicates a relative popularity of the given navigation chain compared to other navigation chains of the list of navigation chains; and
    based on the comparison of the first click rate to the ratio, providing, by the processor, data to update the navigation menu to correspond to a sequence of pages associated with a second navigation chain of the ordering of navigation chains.

5. The method of claim 4, further comprising:
    performing, by the processor, automatic AB testing between the given navigation chain and the second navigation chain; and
    providing, by the processor, data to update the navigation menu based on the performing.

6. The method of claim 4, further comprising:
    determining, by the processor, a second click rate for the second navigation chain;
    comparing, by the processor, the first click rate to the second click rate; and
    based on the comparison of the first click rate to the second click rate, providing, by the processor, data to update the navigation menu to correspond to a sequence of pages associated with a third navigation chain of the ordering of navigation chains.

7. The method of claim 1, wherein the at least one of a uniqueness indication of whether or not the respective past user is a unique user and a success goal indication of whether or not the respective session achieved a defined success goal comprises the uniqueness indication of whether or not the respective past user is a unique user and further comprising determining, by the processor, the ranking based on a unique user count associated with each navigation chain of the ordering of navigation chains.

8. The method of claim 1, wherein the at least one of a uniqueness indication of whether or not the respective past user is a unique user and a success goal indication of whether or not the respective session achieved a defined success goal comprises the success goal indication of whether or not the respective session achieved a defined success goal and further comprising:

adding, by the processor, the given navigation chain to the ordering of navigation chains based on a defined success goal being achieved;

sorting, by entry point, navigation chains created from navigation data comprising a success goal indication;

counting each of the sorted navigation chains having a common entry point; and recommending, to a later user, a navigation chain based on a corresponding count for the navigation chain.

9. The method of claim 8, wherein the defined success goal comprises a money transaction for a product or service and wherein a set of navigation data is recommended only when the respective count is at least a threshold record count value.

10. A system comprising:

a processor; and a memory to store instructions that, when executed by the processor, cause the processor to:

collect navigation data related to how multiple past users navigate among a plurality of pages corresponding to a web site, the navigation data comprising, for each session of each of the multiple past users, an entry point corresponding to a given page of the plurality of pages and at least one of a uniqueness indication defining whether or not a respective past user is a unique user and a success goal indication defining whether or not a respective session achieved a defined success goal;

separate the navigation data into a first subset comprising sessions corresponding to a first set of values for the at least one of the uniqueness indication and success goal indication and a second subset corresponding to a different second set of values for the at least one of the uniqueness indication and success goal indication;

store the first subset of navigation data in a data store, group the first subset of navigation data by unique entry points, and rank the first subset of navigation data by popularity to create a list of navigation chains having an associated ranking; and receiving a selection, via a user interface, of the web site at a selected entry point, select a given navigation chain of the list of navigation chains based on a ranking, and provide data to display on the given page corresponding to the selected entry point, in a navigation menu, wherein the navigation menu corresponds to a sequence of pages associated with the given navigation chain.

11. The system of claim 10, wherein the at least one of a uniqueness indication of whether or not the respective past user is a unique user and a success goal indication of whether or not the respective session achieved a defined success goal comprises the uniqueness indication of whether or not the respective past user is a unique user, wherein the uniqueness indication comprises identification data of the respective past user, the identification data being associated with the respective past user, a client system of the respective past user, and/or a web technology viewer associated with the respective past user and comprises one or more of the respective past user's Internet Protocol address (IP address) and tracker identifier supplied by a web cookie, wherein the given navigation chain comprises a chain of hyperlinks, and the instructions, when executed by the processor, cause the processor to handle the navigation data comprising the uniqueness indication differently from navigation data not comprising the uniqueness indication.

12. The system of claim 10, wherein the at least one of a uniqueness indication of whether or not the respective past user is a unique user and a success goal indication of whether or not the respective session achieved a defined success goal comprises the success goal indication of whether or not the respective session achieved a defined success goal, wherein the instructions, when executed by the processor, cause the processor to treat navigation data associated with a success goal indication indicating that the respective session achieved the defined success goal differently than navigation data associated with a success goal indication indicating that the respective session failed to achieve the defined success goal and wherein the instructions, when executed by the processor, further cause the processor to determine a click rate for the navigation menu and provide data to update the navigation menu in response to the click rate being below a predefined number or a predefined ratio.

13. The system of claim 10, wherein the at least one of a uniqueness indication of whether or not the respective past user is a unique user and a success goal indication of whether or not the respective session achieved a defined success goal comprises the success goal indication of whether or not the respective session achieved a defined success goal and wherein the instructions, when executed by the processor, further cause the processor to:

sort, by entry point, navigation chains created from navigation data comprising a success goal indication;

count each of the sorted navigation chains having a common entry point recommend, to a later user, a navigation chain based on a corresponding count for the navigation chain;

determine a click rate for the given navigation chain; and update the navigation menu to correspond to a sequence of pages associated with a second navigation chain of the list of navigation chains in response to the click rate being below a predetermined number or a predetermined ratio.

14. A machine-readable storage medium encoded with instructions that, when executed by a machine, cause the machine to:

collect navigation data related to how multiple past users navigate among a plurality of pages associated with a web site, the navigation data comprising, for each session of each of the multiple past users, an entry point corresponding to a given page of the plurality of pages and at least one of a uniqueness indication defining whether or not a respective past user is a unique user and a success goal indication defining whether or not a respective session achieved a defined success goal;

filter the navigation data based on the at least one of the uniqueness indication and success goal indication to provide filtered navigation data;

create, based on the filtered navigation data, an ordering of navigation chains having an associated ranking, wherein each navigation chain of the ordering of navigation chains represents a sequence of pages of the plurality of pages visited by a past user of the multiple past users and having a common entry point, and each navigation chain of the ordering of navigation chains corresponds to a defined success goal; and for a current user receive a selection, via a user interface, of the web site at a selected entry point, select a given navigation chain of the ordering of navigation chains based on a ranking, and provide data to display on the given page corresponding to the selected entry point, in a navigation menu, wherein the navigation menu corresponds to the sequence of pages represented by the given navigation chain.

15. The machine-readable storage medium of claim 14, wherein the instructions, when executed by the machine, further cause the machine to:
- determine a click rate for the given navigation chain; and
- provide data to update the navigation menu to correspond to a sequence of pages associated with second navigation chain of the ordering of navigation chains in response to the click rate being below a predetermined number or a predetermined ratio.

16. The system of claim 10, wherein the instructions, when executed by the processor, cause the processor to:
- determine a first click rate for the given navigation chain;
- compare the first click rate to a ratio calculated from the list of navigation chains, wherein the ratio indicates a relative popularity of the given navigation chain compared to other navigation chains of the list of navigation chains;
- based on the comparison of the first click rate to the ratio, provide data to update the navigation menu to correspond to a sequence of pages associated with a second navigation chain of the list of navigation chains;
- determine a second click rate for the second navigation chain;
- compare the first click rate to the second click rate;
- based on the comparison of the first click rate to the second click rate, provide data to update the navigation menu to correspond to a sequence of pages associated with a third navigation chain of the list of navigation chains;
- perform automatic AB testing between the given navigation chain and the second navigation chain; and
- provide data to update the navigation menu based on the performing of automatic A/B testing.

17. The system of claim 10, wherein the instructions, when executed by the processor, cause the processor to:
- determine a first click rate for the given navigation chain;
- compare the first click rate to a ratio calculated from the list of navigation chains, wherein the ratio indicates a relative popularity of the given navigation chain compared to other navigation chains of the list of navigation chains;
- based on the comparison of the first click rate to the ratio, provide data to update the navigation menu to correspond to a sequence of pages associated with a second navigation chain of the list of navigation chains;
- determine a second click rate for the second navigation chain;
- compare the first click rate to the second click rate; and
- based on the comparison of the first click rate to the second click rate, provide data to update the navigation menu to correspond to a sequence of pages associated with a third navigation chain of the list of navigation chains.

18. The system of claim 10, wherein the at least one of a uniqueness indication of whether or not the respective past user is a unique user and a success goal indication of whether or not the respective session achieved a defined success goal comprises the uniqueness indication of whether or not the respective past user is a unique user and wherein the instructions, when executed by the processor, cause the processor to determine the ranking based on a unique user count associated with each navigation chain of the list of navigation chains.

19. The system of claim 10, wherein the at least one of a uniqueness indication of whether or not the respective past user is a unique user and a success goal indication of whether or not the respective session achieved a defined success goal comprises the success goal indication of whether or not the respective session achieved a defined success goal and wherein the instructions, when executed by the processor, cause the processor to:
- add the given navigation chain to the list of navigation chains based on a defined success goal being achieved;
- sort, by entry point, navigation chains created from navigation data comprising a success goal indication;
- count each of the sorted navigation chains having a common entry point; and
- recommend, to a later user, a navigation chain based on a corresponding count for the navigation chain.

20. The system of claim 19, wherein the defined success goal comprises a money transaction for a product or service and wherein a set of navigation data is recommended only when the respective count is at least a threshold record count value.

* * * * *